United States Patent
Vaughn et al.

(10) Patent No.: US 10,950,254 B2
(45) Date of Patent: Mar. 16, 2021

(54) PRODUCING COMPREHENSIBLE SUBTITLES AND CAPTIONS FOR AN EFFECTIVE GROUP VIEWING EXPERIENCE

(71) Applicant: International Business Machines Corporation, Armonk, NY (US)

(72) Inventors: Garfield Vaughn, South Windsor, CT (US); Moncef Benboubakeur, Brno (CZ); Julija Narodicka, Brno (CZ); Aaron K. Baughman, Silver Spring, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 132 days.

(21) Appl. No.: 16/170,110

(22) Filed: Oct. 25, 2018

(65) Prior Publication Data

US 2020/0135225 A1 Apr. 30, 2020

(51) Int. Cl.
| | | |
|---|---|---|
| G10L 15/26 | (2006.01) |
| H04N 21/488 | (2011.01) |
| G10L 21/10 | (2013.01) |
| G06N 3/08 | (2006.01) |
| G10L 15/30 | (2013.01) |
| G10L 15/22 | (2006.01) |

(52) U.S. Cl.
CPC ............. G10L 21/10 (2013.01); G06N 3/08 (2013.01); G10L 15/22 (2013.01); G10L 15/26 (2013.01); G10L 15/30 (2013.01); H04N 21/4884 (2013.01)

(58) Field of Classification Search
CPC ................................................ H04N 21/4884
See application file for complete search history.

(56) References Cited

U.S. PATENT DOCUMENTS

| | | | |
|---|---|---|---|
| 8,826,361 B2 | 9/2014 | Shusman | |
| 9,571,870 B1 | 2/2017 | Wilson et al. | |
| 9,854,324 B1 | 12/2017 | Panchaksharaiah et al. | |
| 10,467,274 B1 * | 11/2019 | Ren .................... | G06K 9/4604 |
| 2004/0006566 A1 | 1/2004 | Taylor et al. | |

(Continued)

OTHER PUBLICATIONS

Xu, Jun, et al. "Learning multimodal attention LSTM networks for video captioning." Proceedings of the 25th ACM international conference on Multimedia. 2017. (Year: 2017).*

(Continued)

Primary Examiner — Jialong He
(74) Attorney, Agent, or Firm — Garg Law Firm, PLLC; Rakesh Garg; James Nock

(57) ABSTRACT

One or more processors identify one or more users expected to consume media content having associated subtitle data. A user profile associated with each of the one or more users is received, and one or more features are extracted from each user profile. The one or more features are representative of a characteristic of the user. A group profile is created for the one or more users based upon the extracted features. The subtitle data associated with the media content is received, and one or more portions of the subtitle data are modified based upon the group profile to generate augmented subtitle data. The augmented subtitle data is sent to a display device for being rendered in the display device.

20 Claims, 5 Drawing Sheets

(56) References Cited

U.S. PATENT DOCUMENTS

| | | | | |
|---|---|---|---|---|
| 2008/0279535 | A1* | 11/2008 | Haque | H04N 21/2355 |
| | | | | 386/244 |
| 2011/0093263 | A1* | 4/2011 | Mowzoon | G10L 15/26 |
| | | | | 704/235 |
| 2013/0104165 | A1* | 4/2013 | Kim | H04N 21/23614 |
| | | | | 725/32 |
| 2014/0282711 | A1* | 9/2014 | Xiong | H04N 21/4884 |
| | | | | 725/34 |
| 2015/0086174 | A1 | 3/2015 | Abecassis et al. | |
| 2015/0304727 | A1* | 10/2015 | Vandichalrajan | H04N 21/482 |
| | | | | 725/40 |
| 2017/0132821 | A1 | 5/2017 | Valliani et al. | |
| 2017/0134807 | A1* | 5/2017 | Shaw | H04N 21/4223 |
| 2018/0160190 | A1* | 6/2018 | Kahn | H04N 21/47217 |
| 2018/0234739 | A1* | 8/2018 | Sreedhara | H04N 21/4884 |
| 2018/0302686 | A1* | 10/2018 | Bhattacharjee | H04N 21/44218 |
| 2019/0340469 | A1* | 11/2019 | Su | G06T 11/60 |

OTHER PUBLICATIONS

Wang, Xin, et al. "Video Captioning via Hierarchical Reinforcement Learning.", 2017 (Year: 2017).*

* cited by examiner

PRODUCING COMPREHENSIBLE SUBTITLES AND CAPTIONS FOR AN EFFECTIVE GROUP VIEWING EXPERIENCE

TECHNICAL FIELD

The present invention relates generally to a method, system, and computer program product for producing captions and subtitles. More particularly, the present invention relates to a method, system, and computer program product for producing comprehensible subtitles and captions for an effective group viewing experience.

BACKGROUND

Subtitling and captioning are both processes of displaying text on a television, video screen, or other visual display to provide additional or interpretive information to viewers of media content. Subtitling and captioning are typically used to provide a transcription of an audio portion of a program, movie, or other media presentation as it occurs. The subtitles or captions are also sometimes used to include descriptions of non-speech elements of the media presentation such as sound effects, musical cues, and other audio information relevant to understanding the media presentation. In another example user, subtitles or captions are used to provide text descriptions in a different language than that of the original media content. For live programs, spoken words from the media presentation are typically either transcribed by a human operator into a test representation, or translated into text by a computer using speech-to-text algorithms. In other cases, text transcripts of a media presentation are available before presentation of the media content, and subtitles and/or captions are displayed during the media presentation to one or more users.

SUMMARY

The illustrative embodiments provide a method, system, and computer program product. An embodiment of a computer-implemented method includes identifying, by one or more processors, one or more users expected to consume media content, the media content having associated subtitle data. The embodiment further includes receiving a user profile associated with a plurality of the one or more users, and extracting one or more features from each user profile, the one or more features representative of a characteristic of the user. The embodiment further includes creating a group profile for the plurality of the one or more users based upon the extracted features, and receiving the subtitle data associated with the media content. The embodiment further includes modifying one or more portions of the subtitle data based upon the group profile to generate augmented subtitle data, and sending the augmented subtitle data to a display device for being rendered in the display device.

Another embodiment further includes rendering the augmented subtitle data in the display device. Another embodiment further includes presenting the media content by the display device in synchronization with the rendering of the augmented subtitle data.

Another embodiment further includes determining a change in a level of engagement of one of more of the users with the media content, and further modifying the subtitle data to obtain a higher level of engagement of the one or more users with the media content. In another embodiment, determining the level of engagement based upon an input from one or more sensors within the viewing environment.

In another embodiment, extracting the one or more features is based upon cognitive processing of the user profile. In another embodiment, creating the group profile includes determining a value of a feature that satisfies a best match within a threshold value of the feature among the one or more users. In another embodiment, the user profile is based upon one or more of previous content consumed by the user, social media posts by the user, and input from a sensor associated with the user.

In another embodiment, the one or more features include one or more of a language usage, a parental guide rating, a demographic characteristic, a mood, an experience, a motion, physical health, and a lexicon of the user. In another embodiment, modifying the one or more portions of the subtitle data utilizes machine learning.

Another embodiment further includes identifying a source of the media content. In another embodiment, the identifying of the one or more users includes receiving a list of the one or more users. In another embodiment, the receiving of the subtitle data associated with the media content is responsive to requesting the subtitled data.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
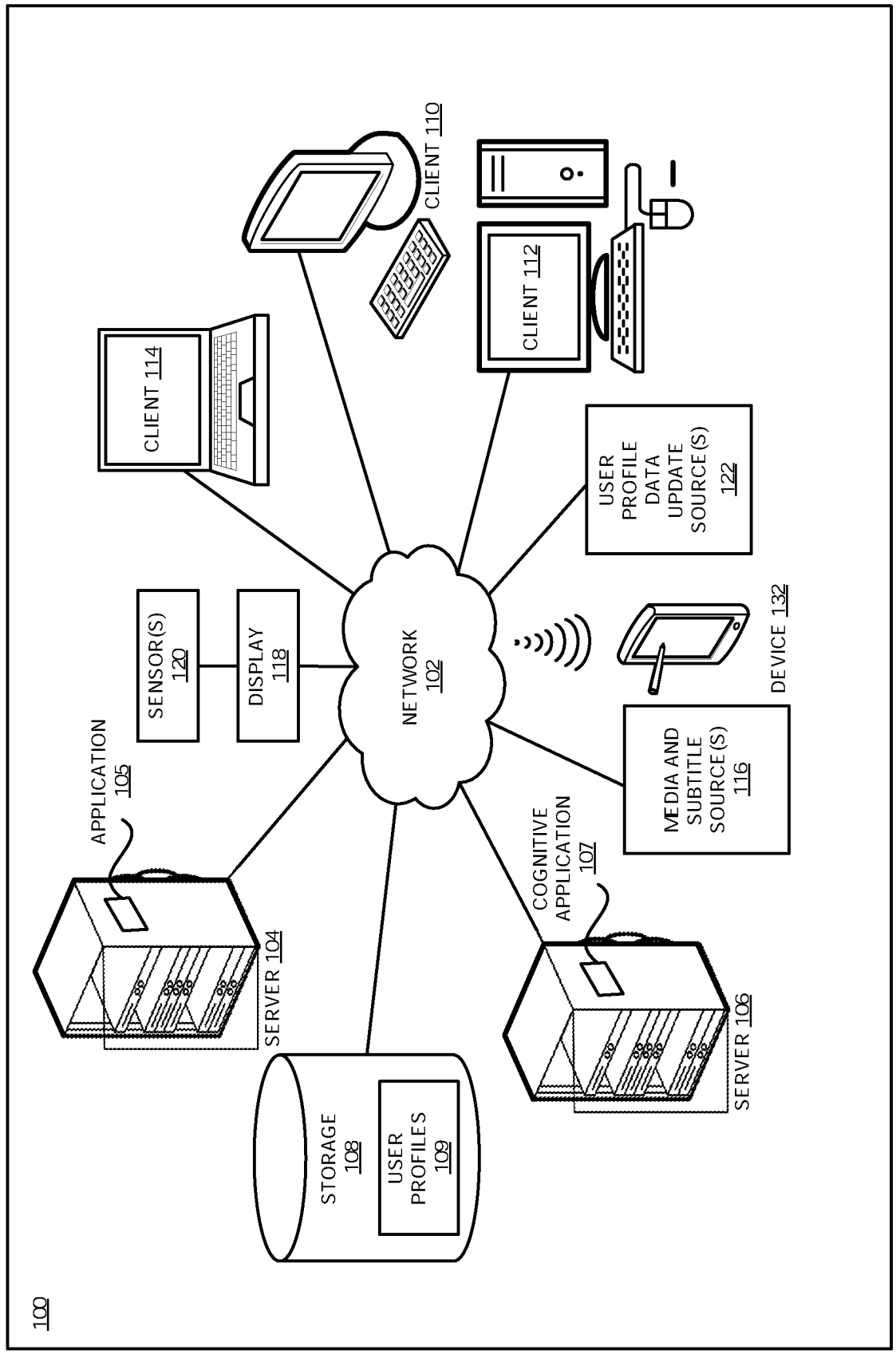
FIG. 1 depicts a block diagram of a network of data processing systems in which illustrative embodiments may be implemented.

The illustrative embodiments described herein are directed to. One or more embodiments recognize that viewing videos, movies, television programs, and other media content is often a group experience involving multiple people having a diverse characteristics that may not be the same for every person. Examples of such characteristics include a person's current health, demographic characteristics, parental guide rating, and language/dialect. One or more embodiments recognize that some members of a group may experience confusion when watching the same media content due to these differences in characteristics. Embodiments further recognize that a need exists to make sure as many members of a group of viewers obtain a common and/or same understanding of the media content during viewing.

In an example, if some members of the viewing group understand different languages and/or dialects, a need exists to determine the best language to ensure the highest rate of understanding among the group members. In another example, a family gets together on a weekend to watch a movie. Embodiments recognize that trying to select a movie that is appropriate for the members of the audience who will be viewing the movie is a time consuming an inaccurate task. Many people rely on movie ratings, reviews, and self-censoring to determine a movie to watch. However, embodiments recognize that such methods of selecting a movie are not sufficiently able to take into account the diverse characteristics of the members of the audience.

In another example, a host is hosting a party for a group of guests and is trying to decide what movie will be appropriate. A host is required to know the personal details about each guest demographic characteristic. Embodiments recognize that such knowledge is not always possible, and although the host may know some personal details of some of the guests, the host may not be aware of conflicts between some of the values of the guests.

In another example, viewers of media content may not be in a situation or environment, a large electronic store, in which the viewers are able to interact with a remote control to change or reach agreement regarding the presentation of subtitles or captions associated with the media content.

Accordingly, one or more embodiments recognize that a need exists to enable a higher rate of understanding of the members of the group of viewers of subtitles, captions, or other displayed text content, associated with media content. One or more embodiments are directed to producing comprehensible subtitles and captions for an effective group viewing experience. In one or more embodiments, a system uses personal profile data including personal characteristics, attributes and/or preferences for each user viewing media content to produce a profile for the group, generate a single subtitle or caption stream for the group based upon the group profile. In one or more embodiments described herein, characteristics, attributes, and/or preferences associated with a user are referred to as "features".

In one or more embodiments, the system generates the group profile based on the features (e.g., characteristics and/or attributes) associated with each user such as one or more of a user's language usage, a parental guide rating, a demographic characteristic, a mood, an experience, a motion, physical health, and a lexicon/vocabulary.

In one or more embodiments, the system defines and configures an algorithm and/or rule to drive feature selection results. In particular embodiments an algorithm may include, for example, determining a lowest common value for a feature, and determining whether the value satisfies a best match within a threshold value (e.g. 80%) of the feature among the users. In an embodiment, the system may prioritize certain features so that features such as an age of a person may carry different weights. In an embodiment, after the common denominator is found the system understands the viewers and their individual needs, and extract and derives the best of the values that will better represents the group's needs in each of the defined features. As a result new subtitles are generated that provide the best fit to the group based upon the group profile and are added to the media content during presentation of the media content.

In an embodiment, a user begins interacting with a display device, such as a smart media display, using a remote and/or a smart device. In the embodiment, the user browses and selects a media source provided from a media and subtitles sources component to be viewed by one or more users. In the embodiment, the display device creates a package that contains the media content to be viewed and a list of users who are expected to view or otherwise consume the media content and sends the package to an augmented subtitled system. In the embodiment, the augmented subtitle system sends a first request to a feature extraction system including the list of users. In the embodiment, the feature extraction system extracts features from a user profile associated with each user and creates a group profile based upon the extracted features. In the embodiment, the augmented subtitle system receives a first response from the feature extraction system including values of one or more features associated with each user required to generate an augmented subtitle. In the embodiment, the augmented subtitle system further sends a second request to the subtitle abstraction system including an identifier, such as title, of the media content and receives a response including raw subtitle input data associated with the media content.

The augmented subtitle system begins modifying the raw subtitle data based upon the group profile to generate augmented subtitle data. In one embodiment, the augmented subtitle system modifies the raw subtitle data on a feature-by-feature basis by determining whether text associated with each feature within the raw subtitle data is to be modified based upon the group profile. For example, a particular feature may be associated with removal of undesired language. In the example, the augmented subtitle system determines whether the feature should be activated or not based upon the group profile. If the feature is to be activated, the augmented subtitle system modifies the instance of undesired language such as substituting an alternate word or phrase that is acceptable based upon the characteristics of one or more users as represented by the group profile. In one or more embodiments, the augmented subtitle system repeats the actions for the next feature, and the process continues for each section of the subtitle text. In the embodiment, the augmented subtitle system provides the augmented subtitle data to the display device, and the display device renders the augmented subtitle data in conjunction with displaying the associated selected media content.

In an embodiment, the system is configured to monitor the group of users during presentation of the media content and determine whether a change group membership and/or a change in a level of user response/engagement has occurred, and generate the remaining portion of the subtitle using the features of the new group. For example, if a member of the original group is a person who has fallen asleep or left the room, the system may be configured to detect this change in the group and further modify the augmented subtitle data to reflect this change. The newly modified subtitle data is sent to the display device as the currently active subtitle for the media content.

In an embodiment, a user profile maintenance component is configured to run according to a defined schedule and update user profiles from a user database using information extracted from one or more user profile update data sources such as a social media source, inputs from one or more sensors (e.g., a motion sensor) associated with the display device, input from a personal device having a sensor (e.g., a smart watch or smart phone) associated with one or more users, or preference information associated with a user account of a digital streaming system. In a particular embodiment, the user profile maintenance component uses cognitive application programming interfaces (APIs), such as a tone analyzer API or personality insights API, to extract features from the one or more user profile update data sources.

An embodiment can be implemented as a software application. The application implementing an embodiment can be configured as a modification of an existing system or platform, as a separate application that operates in conjunction with an existing system or platform, a standalone application, or some combination thereof.

The illustrative embodiments are described with respect to certain types of tools and platforms, procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
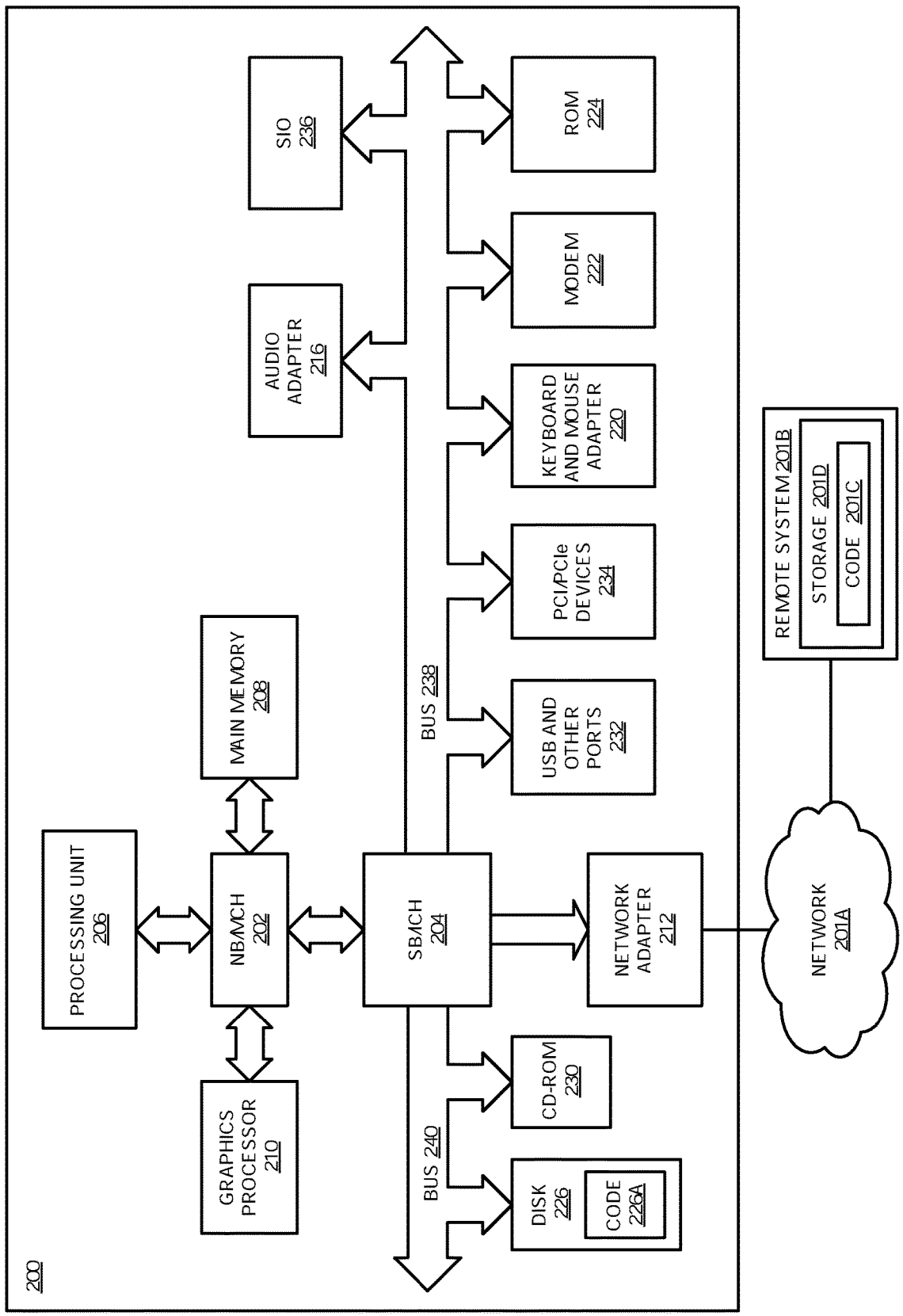
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for producing comprehensible subtitles and captions for an effective group viewing experience in accordance with one or more embodiments.

Server 106 implements a cognitive application 107 configured to extract features from user profiles using cognitive processing of the user profiles as described herein with respect to various embodiments. Storage device 108 includes one or more user profiles 109 configured to store user profile data including one or more features associated a user as described herein. In other embodiments, the functions of server 106 and/or application 107 may instead be performed by server 104 and/or application 105, respectively.

Data processing environment 100 further includes one or more media and subtitle sources 116 in communication with network 102 configured to provide media content and associated raw subtitle data to application 105. Data processing environment 100 further includes a display device 118 and one or more sensors 120 in communication with network 102. Display device 118 is configured to display selected media content and render augmented subtitle data as described herein with respect to certain embodiments. Sensor(s) 120 are configured to detect conditions of one or more users within a viewing environment of display device 118 such as a level of engagement of one or more users with the media content during presenting of the content. Data processing environment 100 further includes one or more user profile data update sources 122 in communication with network 102 configured to provide user profile update data for updated the features associated with each user represented by the user profile as described herein with respect to certain environments.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
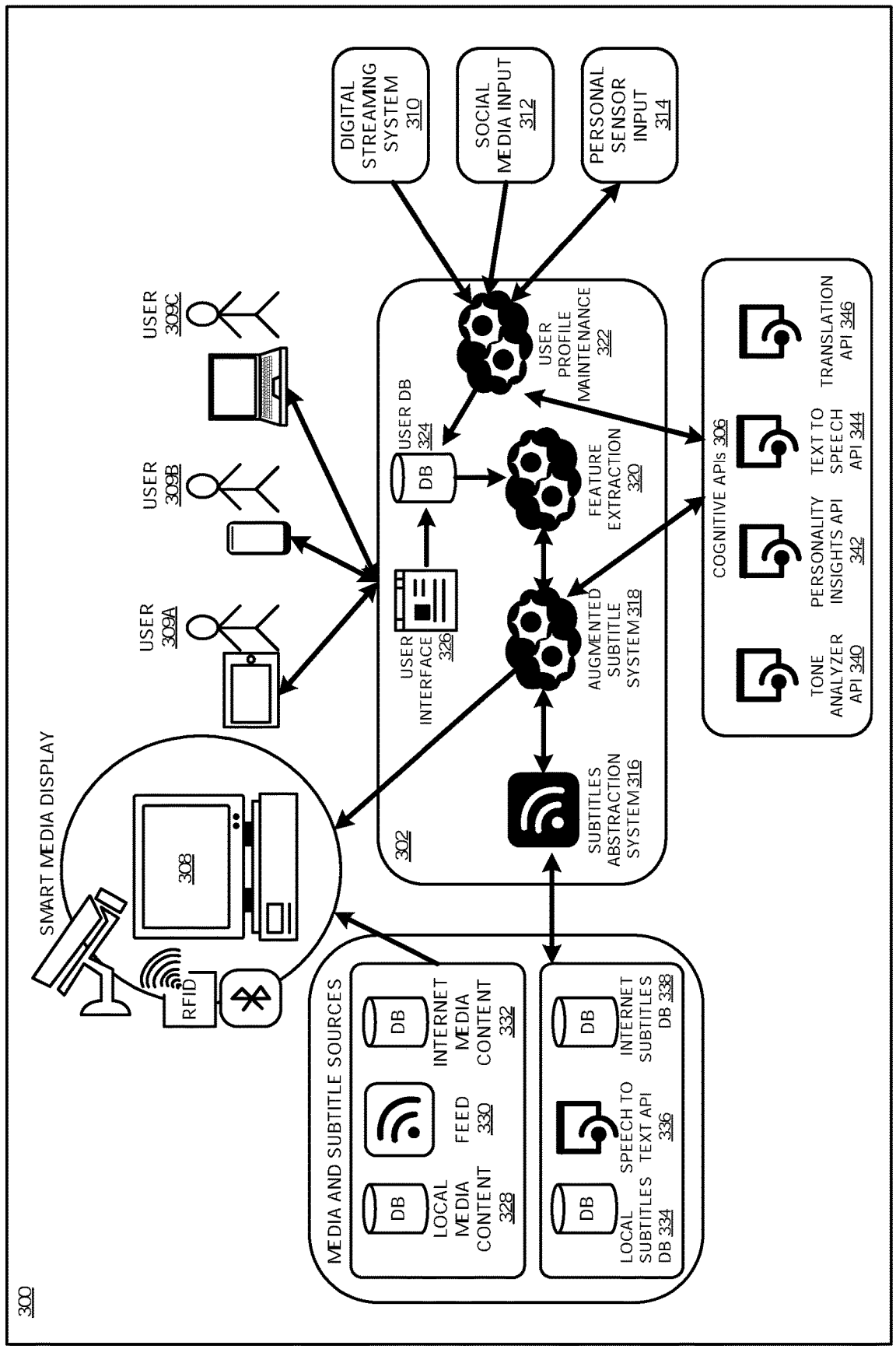
FIG. 3 depicts a block diagram of an example configuration for producing comprehensible subtitles and captions for an effective group viewing experience in accordance with an illustrative embodiment.

With reference to FIG. 3, this figure depicts a block diagram of an example configuration 300 for producing comprehensible subtitles and captions for an effective group viewing experience in accordance with an illustrative embodiment. The example embodiment includes an application 302. In a particular embodiment, application 302 is an example of application 105 of FIG. 1.

Application 302 is in communication with media and subtitle sources 304, cognitive APIs 306, a smart media display 308, a digital streaming system 310, a social media input 312, and a personal sensor input 314. Application 302 is in further communication with a first user 309A, a second user 309B, and a third user 309C located in the environment of smart media display 308 and desiring to view media content and subtitle information displayed in smart media display 308.

In the embodiment, smart media display 308 is configured to present media content and associated augmented subtitles to first user 309A, second user 309B, and third user 309C. In one or more embodiments, smart media display 308 is configured to detect first user 309A, second user 309B, and third user 309C using, for example, Bluetooth™, a Wi-Fi, radio frequency identification (RFID) detection of devices associated with the users. In particular embodiments, the user detection is performed at the time the media content is selected and periodically throughout the time the media content is being viewed. In one or more embodiments, the system generates subtitle for the remaining un-watched media each time the user list has changed. In one or more embodiments, smart media display 308 combines and synchronizes the augmented subtitle data with the media content being displayed. In one or more embodiments, smart media display 308 monitors the group of users and identifies when members change or changes in the group that impact the cognitive state of the group. In one or more embodiments, smart media display 308 uses a camera and facial recognition software to monitor the expressions of group members to detect changes in conditions and/or emotions of one or more users and determine if the augmented subtitle data should be modified further according to the changed conditions and/or emotions.

In the embodiment, application 302 includes a subtitle abstraction system 316, an augmented subtitle system 318, a feature extraction component 320, a user profile maintenance component 322, a user database (DB) 324, and a user interface 326. In an embodiment, subtitle abstraction system 316 is configured to retrieve media content and associated subtitle information from one or more media and subtitle sources 304. In particular embodiments, media sources may include one or more of local media content 328, a content feed, and internet media content 332. In particular embodiments, subtitle data sources may include one or more of a local subtitle DB 334 to provide subtitle data when requested, a speech to text API 336 to transform a dialog/narration of media content to a text feed of subtitles, or an internet subtitles database 338, such as www.opensubtitles.org, providing a source of subtitle data associated with particular media content.

In an embodiment, media and subtitle sources 304 provide subtitle abstraction system 316 with the subtitle data for further processing. In an example, a user selects a movie from media and subtitle sources 304, and media and subtitle sources 304 automatically sends the subtitles attached to the content to subtitle abstraction system 316. In another example, a user selects a video from an internet source, and media and subtitle sources 304 uses speech to text API 336 to generate the subtitle data.

In an embodiment, feature extraction component 320 is configured to generate a single group feature profile based on all the different available features (e.g., language usage, parental guide rating, a demographic characteristic, user's mood, experience, motion, physical health, and lexicon) of the users such as first user 309A, second user 309B, and third user 309C. In the embodiment, feature extraction component 320 receives a request from augmented subtitle system 318 which includes a list of users of the group expected to view or otherwise consume the content such as first user 309A, second user 309B, and third user 309C. Using the list of users feature extraction component 320 obtains user personal profile information from users DB 324. In the embodiment, feature extraction component 320 uses a defined algorithm of prioritization to generate the single group feature profile. In a particular embodiment, the group profile includes each feature (e.g., language usage, demographic characteristics, parental guide rating, user's mood, experience, motion, physical health) and the value for each feature to be representative of the group based on the algorithm used.

In the embodiment, user interface (UI) 326 allows one or more users (e.g., users 309A-309C) using different devices to perform many activities such as managing the user's respective profile, configure social media accounts, defining user preferences, and monitoring devices such as health monitoring, smart house systems, smart watches and Internet of Things (IoT) devices. UI 326 further allows gathering and monitoring personal data about the user that will be used to update their profile and used by augmented subtitle system 318 when augmenting the subtitle text as further described herein.

In the embodiment, users DB 324 stores a user's profile, preferences, and insights generated by the user profile maintenance component 322. In the embodiment, user profile maintenance component 322 is configured to request, retrieve and store personal user data from external systems such as one or more of digital streaming system 310, social media input 312, and personal sensor input 314. In one or more embodiments, user profile maintenance component 322 is configured to have a defined crawling schedule of when and how frequently data is to be retrieved. In a particular embodiment, once data is received, the data is processed through a cleaning component that converts the input data into a format that is usable by the system.

In one or more embodiments, user profile maintenance component 322 utilizes one or more of cognitive APIs 306 to extract one or more of natural language, emotion, and personality insights to analyze social media sources to extract insights about user emotional state (e.g., happy, angry, Sad, etc.), extract the lexicon used by the user, and analyze data captured from IoT and other monitoring devices. In a particular embodiment, cognitive APIs 306 include one or more of a tone analyzer API 340 to analyze determine a tone of a user, a personality insights API 342 to determine personality insights of a user, a text-to-speech API 344, and a translation API 346 to translate between languages and/or dialects. For example, if the input text is in a language other than the preferred language of the user, the system will use translation API 346 to convert the input text to the user's preferred language before analyzing and augmenting.

In an embodiment, digital streaming system 310 is configured to monitor digital content consumed by a user such as videos watched, e-books read, and music listened to extract insights of a user to assist user profile maintenance component 322 to define the profile of the user based upon previous content consumed by the user. For example, the profile may contain the types of movies the user prefers and the language of the movies. In another example, the language and level of comprehension of each user can be understood based on the e-books the user has read. In another example, the music a user listens to may assist user profile maintenance component 322 to determine the language for which a user is comfortable.

In an embodiment, social media input 312 is configured to assist user profile maintenance component 322 to extract insights about the user's emotional state, lexicon, etc. from the user's social media accounts. In a particular embodiment, UI 326 enables a user to configure social media accounts and link the social media accounts to the user's profile.

In an embodiment, personal sensor input 314 is configured to receive data from personal devices such as IoT devices, a smart watch, a smart home system, a health monitoring system, or an augmented reality device to assist in extracting a health status of the user over time. In a particular embodiment, UI 326 enables a user to configure the user's devices and link the devices to the user profile associated with the user.

In an embodiment, augmented subtitle system 318 is configured to periodically receive the group features from feature extraction component 320 and transforming the subtitle text to ensure that the subtitle text is appropriate for the user group as determined by the group profile. As the number of users of the group change, augmented subtitle system 318 is configured to update the group features profile. In a particular embodiment, augmented subtitle system 318 relies on knowledge across multiple domains to understanding the likes, dislikes, demographic characteristics, lexicon and other personal user properties of the users, generates a group profile based upon the individual user profiles of the viewing users and generates an augmented version of the input subtitle text to be provided to smart media display 308.

In an embodiment, augmented subtitle system 318 is implemented using a deterministic system to detect an input language and a desired language output by checking a user profile to determine a language preference of the user. In the embodiment, the augmented subtitle system 318 may call translation API 346 to translate the language if needed, and check the user profile to obtain current user personal settings or features to be used to generate the group profile to make a determination of words and/or phrases to replace in the raw subtitle input data to produce augmented subtitle data.

In another embodiment, augmented subtitle system 318 is implemented using a machine learning system. In the embodiment, the machine learning system is trained using various types of training data sets associated with users such as lexicon, demographic characteristics, and somatic state from sensors. In the embodiment, when the system needs to augment a subtitle, the system takes the original raw subtitle data and the feature values from the user profile to create an array of values that are input to the input neurons of the machine learning system to produce an array that contains the augmented version of the subtitle data. In the embodiment, the augmented version of the subtitle data is presented to users 309A-309C during viewing of selected media content.

Figure 4:
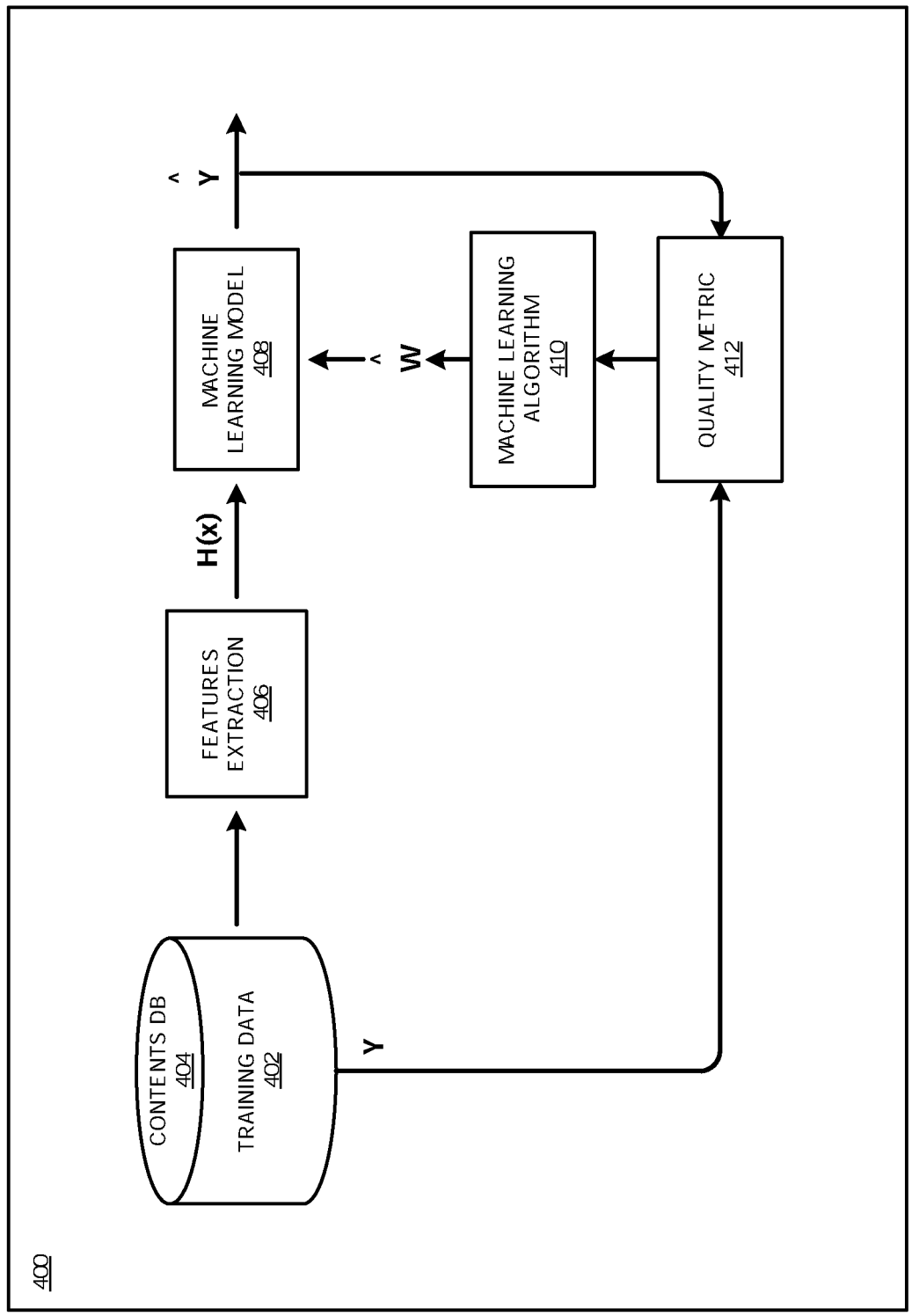
FIG. 4 depicts a block diagram of an example training architecture for machine-learning based augmented subtitle generation in accordance with an illustrative embodiment.

With reference to FIG. 4, this figure depicts a block diagram of an example training architecture 400 for machine-learning based augmented subtitle generation in accordance with an illustrative embodiment. In one or more embodiments, training architecture 400 is implemented by application 105 of FIG. 1. In the example, program code extracts various features/attributes 406 from training data 402, which may be resident in one or more contents databases 404. The features are utilized to develop a predictor function, h(x), also referred to as a hypothesis, which the program code utilizes as a machine learning model 408. In identifying various features/attributes in the training data 402, the program code may utilize various techniques including, but not limited to, mutual information, which is an example of a method that can be utilized to identify features in an embodiment. Other embodiments may utilize varying techniques to select features, including but not limited to, principal component analysis, diffusion mapping, a Random Forest, and/or recursive feature elimination (a brute force approach to selecting features), to select the features. "Y" is the conclusion (e.g., element) that can be reached (e.g., a mood, lexicon, demographic characteristic, etc. for a user), which when identified in the profile of a user would trigger the program code to make a given discrete change to the subtitle text. The program code may utilize a machine learning algorithm 410 to train machine learning model 408, including providing weights for the conclusions, so that the program code can prioritize various changes located based on the predictor functions that comprise the machine learning model 408. The conclusions can be evaluated by a quality metric 412.

By selecting a diverse set of training data 402, the program code trains machine learning model 408 to identify and weight various attributes of users, including but not limited to, users with a variety of lexicons, demographic characteristics, and/or somatic states. To utilize the machine learning system to augment a subtitle, the program code obtains (or derives) the original subtitle and values from the group profile to generate an array of values that to input into input neurons of a neural network. Responsive to these inputs, the output neurons of the neural network produce an array that includes the augmented version of the text (e.g., subtitles or captions) to be presented contemporaneously with the visual content of the media.

Figure 5:
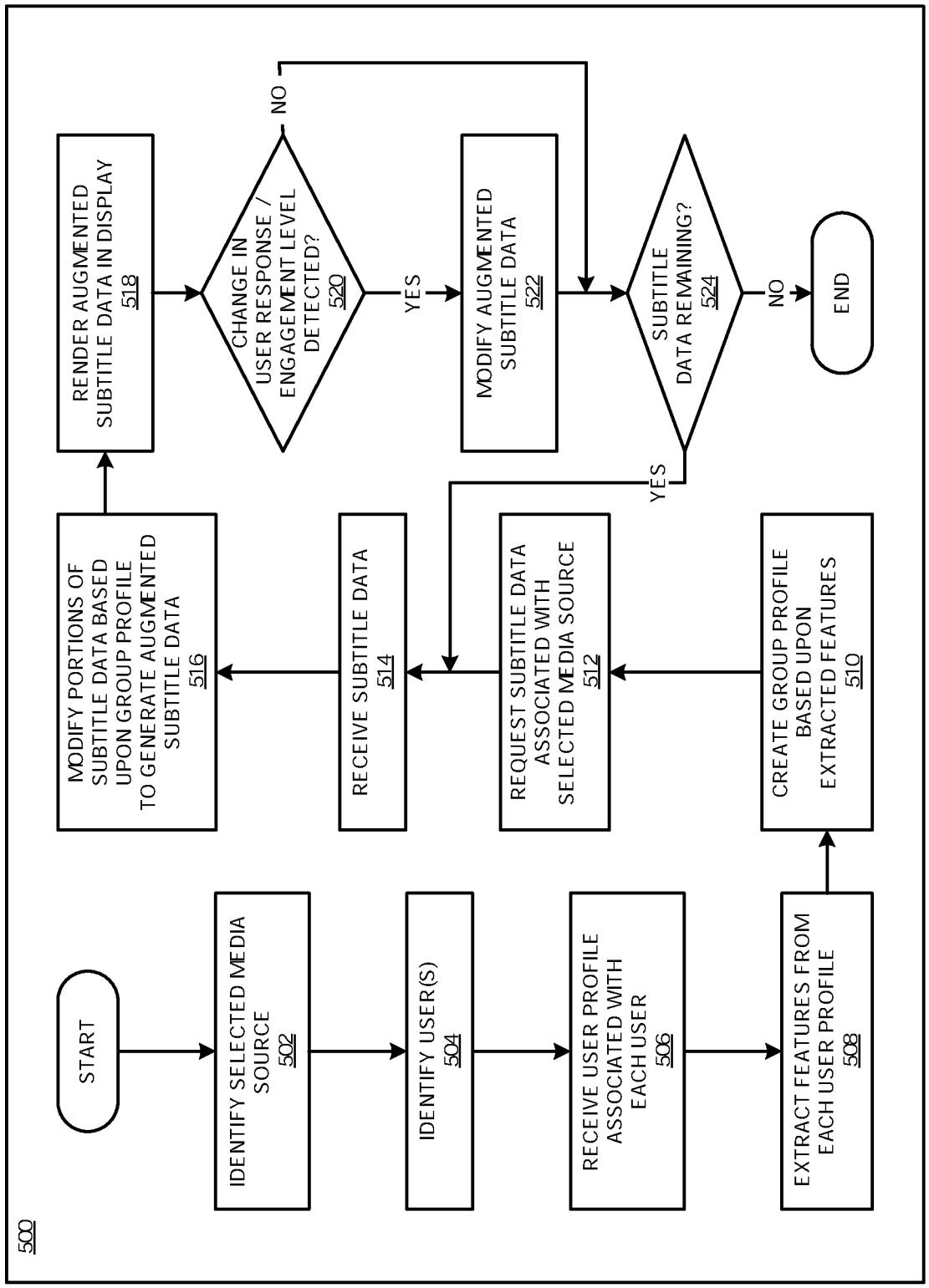
FIG. 5 depicts a flowchart of an example process for producing comprehensible subtitles and captions for an effective group viewing experience.

With reference to FIG. 5, this figure depicts a flowchart of an example process 500 for producing comprehensible subtitles and captions for an effective group viewing experience in accordance with an illustrative embodiment. In block 502, application 105 identifies a selected media source. In block 504, application 105 identifies one or more users expected to view or otherwise consume the selected media source. In a particular embodiment, application 105 receives a list of a group of user. In block 506, application 105 receives a user profile associated with each user.

In block 508, application 105 extracts features from each user profile. In block 510, application 105 creates a group profile based upon the extracted features for each user. In block 512, application 105 requests subtitle data associated with the selected media source from one or more subtitle sources. In block 514, application 105 receives the requested original subtitle data.

In block 516, application 105 modifies portions of the subtitle data based upon the group profile to generate augmented subtitle data. In block 518, the application 105 sends the augmented subtitle data to a display and the display renders the augmented subtitle data in a display in synchronization with presenting of the media source.

In block 520, application 105 determines a user response and/or engagement level of one or more users and detects whether there is a change in the user response and/or the user engagement level greater than a threshold level in response to viewing the media source and the augmented subtitle data. In one or more embodiments, application 105 detects whether there is a change in a user response and/or user engagement level in response to viewing the media source and the augmented subtitle data based upon an input from one or more sensors within the viewing environment.

If application 105 determines in block 520 that there is a change in a user response and/or user engagement level greater than the threshold level, in block 522 application 105 further modifies the augmented subtitle data based upon the change and the process 500 continues to block 524. In one or more embodiments, application 105 further modifies the subtitle data to obtain a higher level of engagement of the user with the media content. In one or more embodiments, application 105 modifies the subtitled data by substituting an alternate word or phrase that is expected to increase the engagement level of the user. If application 105 determines in block 520 that there is not a change in a user response and/or user engagement level greater than the threshold level, process 500 continues to 524.

In block 524, application 105 determines whether there is subtitle data remaining. If application 105 determines that there is subtitle data remaining, process 500 returns to block 514 in which additional subtitle data is received. If application 105 determines that there is no subtitle data remaining, process 500 ends.

Thus, a computer implemented method, system or apparatus, and computer program product are provided in the illustrative embodiments for depicts a flowchart of an example process for producing comprehensible subtitles and captions and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
   identifying, by one or more processors, one or more users expected to consume media content, the media content having associated subtitle data;
   receiving a user profile associated with each of the one or more users;
   extracting one or more features from each user profile, the one or more features representative of a characteristic of the user;
   creating a group profile that is representative of features of the plurality of the one or more users said group profile being based upon the extracted features;
   receiving the subtitle data associated with the media content;
   automatically modifying one or more portions of the subtitle data based upon the group profile to generate augmented subtitle data; and
   sending the augmented subtitle data to a display device for being rendered in the display device;

wherein the modifying includes using a machine learning model that has been trained with training datasets associated with a plurality of one or more other users, the training datasets including a lexicon, a demographic characteristic and/or a somatic state of said one or more other users, wherein responsive to receiving the subtitle data and values of the features from the group profile, computing a corresponding array of values as input to said machine learning model in order to produce an output array that contains the augmented subtitle data.

2. The computer-implemented method of claim 1, further comprising:

rendering the augmented subtitle data in the display device.

3. The computer-implemented method of claim 2, further comprising:

presenting the media content by the display device in synchronization with the rendering of the augmented subtitle data.

4. The computer-implemented method of claim 1, further comprising:

determining a change in a level of engagement of one of more of the users with the media content; and further modifying the subtitle data to obtain a higher level of engagement of the one or more users with the media content.

5. The computer-implemented method of claim 4, further comprising determining the level of engagement based upon an input from one or more sensors within a viewing environment.

6. The computer-implemented method of claim 1, wherein extracting the one or more features is based upon cognitive processing of the user profile.

7. The computer-implemented method of claim 1, wherein creating the group profile includes determining a value of a feature that satisfies a best match within a threshold value of the feature among the one or more users.

8. The computer-implemented method of claim 1, wherein the user profile is based upon one or more of previous content consumed by the user, social media posts by the user, and input from a sensor associated with the user.

9. The computer-implemented method of claim 1, wherein the one or more features include one or more of a language usage, a parental guide rating, a demographic characteristic, a mood, an experience, a motion, physical health, and a lexicon of the user.

10. The computer-implemented method of claim 1, further comprising:

identifying a source of the media content.

11. The computer-implemented method of claim 1, wherein the identifying of the one or more users includes receiving a list of the one or more users.

12. The computer-implemented method of claim 1, wherein the receiving of the subtitle data associated with the media content is responsive to requesting the subtitled data.

13. A computer usable program product comprising one or more computer-readable storage devices, and program instructions stored on at least one of the one or more storage devices, the stored program instructions comprising:

program instructions to identify, by one or more processors, one or more users expected to consume media content, the media content having associated subtitle data;

program instructions to receive a user profile associated with each of the one or more users;

program instructions to extract one or more features from each user profile, the one or more features representative of a characteristic of the user;

program instructions to create a group profile that is representative of features of the plurality of the one or more users said group profile being based upon the extracted features;

program instructions to receive the subtitle data associated with the media content;

program instructions to automatically modify one or more portions of the subtitle data based upon the group profile to generate augmented subtitle data; and program instructions to send the augmented subtitle data to a display device for being rendered in the display device, wherein to automatically modify the one or more portions, the program instructions use a machine learning model that has been trained with training datasets associated with a plurality of one or more other users, the training datasets including a lexicon, a demographic characteristic and/or a somatic state of said one or more other users, wherein responsive to receiving the subtitle data and values of the features from the group profile, the program instructions compute a corresponding array of values as input to said machine learning model in order to produce an output array that contains the augmented subtitle data.

14. The computer usable program product of claim 13, further comprising:

program instructions to render the augmented subtitle data in the display device.

15. The computer usable program product of claim 13, further comprising:

program instructions to present the media content by the display device in synchronization with the rendering of the augmented subtitle data.

16. The computer usable program product of claim 13, wherein the computer usable code is stored in a computer readable storage device in a data processing system, and wherein the computer usable code is transferred over a network from a remote data processing system.

17. The computer usable program product of claim 13, wherein the computer usable code is stored in a computer readable storage device in a server data processing system, and wherein the computer usable code is downloaded over a network to a remote data processing system for use in a computer readable storage device associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to identify, by one or more processors, one or more users expected to consume media content, the media content having associated subtitle data;

program instructions to receive a user profile associated with each of the one or more users;

program instructions to extract one or more features from each user profile, the one or more features representative of a characteristic of the user;

program instructions to create a group profile that is representative of features of the plurality of the one or more users said group profile being based upon the extracted features;

program instructions to receive the subtitle data associated with the media content;

program instructions to automatically modify one or more portions of the subtitle data based upon the group profile to generate augmented subtitle data; and program instructions to send the augmented subtitle data to a display device for being rendered in the display device, wherein to automatically modify the one or more portions the program instructions use a machine learning model that has been trained with training datasets associated with a plurality of one or more other users, the training datasets including a lexicon, a demographic characteristic and/or a somatic state of said one or more other users, wherein responsive to receiving the subtitle data and values of the features from the group profile, the program instructions compute a corresponding array of values as input to said machine learning model in order to produce an output array that contains the augmented subtitle data.

19. The computer system of claim 18, the stored program instructions further comprising:

program instructions to render the augmented subtitle data in the display device.

20. The computer system of claim 18, the stored program instructions further comprising:

program instructions to present the media content by the display device in synchronization with the rendering of the augmented subtitle data.

* * * * *